United States Patent [19]

D'Avolio et al.

[11] Patent Number: 5,195,142
[45] Date of Patent: Mar. 16, 1993

[54] PIEZOELECTRIC TRANSDUCER

[75] Inventors: Antonio D'Avolio, Magliano Dei Marsi; Luigi Pesenti, Milan, both of Italy

[73] Assignee: Alcatel Dial Face S.p.A., Milan, Italy

[21] Appl. No.: 685,957

[22] Filed: Apr. 16, 1991

[30] Foreign Application Priority Data

May 14, 1990 [IT] Italy ............................. 21175/90[U]
May 14, 1990 [IT] Italy ............................. 21176/90[U]

[51] Int. Cl.⁵ ..................... H04R 25/00; H04M 1/00; H01L 41/04
[52] U.S. Cl. ................................. 381/173; 381/190; 310/324; 310/348; 379/433
[58] Field of Search ............... 381/173, 190; 310/324, 310/345, 354, 355, 356, 348; 379/433, 440, 443; 29/594

[56] References Cited

U.S. PATENT DOCUMENTS

| | | | |
|---|---|---|---|
| 4,429,247 | 1/1984 | Feldman | 310/324 |
| 4,604,606 | 8/1986 | Sweany | 310/324 |
| 4,626,732 | 12/1986 | Debaisieux et al. | 310/348 |
| 4,944,017 | 7/1990 | Cognasse et al. | 379/443 |
| 4,965,483 | 10/1990 | Abe et al. | 381/190 |
| 4,984,268 | 1/1991 | Brown et al. | 379/433 |

FOREIGN PATENT DOCUMENTS

| | | | |
|---|---|---|---|
| 3504011 | 8/1986 | Fed. Rep. of Germany | 381/173 |
| 88-06644 | 3/1988 | France . | |
| 0236398 | 9/1986 | Japan | 381/190 |
| 0222598 | 9/1989 | Japan | 381/190 |
| 0283493 | 9/1989 | Japan | 310/324 |
| 2096860 | 10/1982 | United Kingdom . | |

OTHER PUBLICATIONS

Patent Abstracts of Japan, vol. 10, No. 46 (E-383) [2103], Feb. 22, 1986, Abstract of JP 60-199298 of Oct. 8, 1985.

Primary Examiner—James L. Dwyer
Assistant Examiner—Jason Chan
Attorney, Agent, or Firm—Spencer, Frank & Schneider

[57] ABSTRACT

To reduce costs and improve piezoceramic transducers, use of a spool with nail-shaped contacts forced thereinto, pressed against the vibrating diaphragm by an elastic O-ring to eliminate solderings and/or spring contacts.

11 Claims, 3 Drawing Sheets

PIEZOELECTRIC TRANSDUCER

BACKGROUND OF THE INVENTION

The invention relates to an electroacustic transducer of the piezoceramic type, which is suitable for use as a piezoceramic capsule or as a tone caller in telephone instruments.

Piezoceramic transducers currently used in telephone instruments comprise essentially a transducer diaphragm, maintained peripherally in position in a cavity between a bottom of the case, with one wall perforated in order to allow the transmission of sound, and a cover to which terminals for external electrical connection are applied.

The electrical connection between the diaphragm and these terminals is established either by means of thin wires or extensions of the terminals themselves both soldered on the poles of the diaphragm.

Soldering on the diaphragm causes drawbacks. In fact, the solder joints on the ceramic layer often detach; moreover, efficiency problems may arise since the solderings are not perfectly equal in all the pieces of a production series and the efficiency is not constant; last, but not least, costs are high. In order to avoid soldering on the diaphragm several attempts have been made.

From French patent application no. 8806644, there is known a telephone transducer with a piezoelectric unit in which the electrical connections to the diaphragm are established through two spring contact terminals of dutch metal bronze which are arranged in such a way as to apply pressure, one on the annular portion of the diaphragm substrate, and one on the ceramic layer covering the central portion of the substrate.

With structures like that soldering of the diaphragm is unnecessary; however, they are not free of drawbacks.

First of all, the electrical connection members manufactured by punching and bending from a matrix of rolled material, do not allow a constant contact pressure on the diaphragm because of manufacturing tolerances, and this create problems of efficiency for the diaphragm.

Moreover, the bends could change their angulation during the assembling of the unit; the springs require adjusting and, consequently, the connection members which cannot be forced into the terminal fitting holes of the bottom require a successive sealing of such holes in order to avoid leakage of the unit.

Further, the spring contact on the ceramics applies pressure on the inner area of the diaphragm and this worsens the situation.

From Patent Abstracts of Japan, vol. 10, no. 46 (E-383) (2103), Feb. 22, 1986, there is known a piezoelectric acoustic transducer in which a piezoelectric vibrator is constituted of a unimorphic vibrator where a piezoelectric ceramic element is bonded to a metallic plate and arranged so that the side of the element will point the opening side of a case. A support ring is formed by an insulating part and a conductive part and a spring terminal is fitted to a notch. The terminal consists of a contact part and a fitting part formed with a spring material and temporarily fixed after a folding piece of the fitting part is fitted in a not-notched thin part of the insulating part. A damping film is applied to a copper foil patterns of a cover. External terminals are inserted into terminal fitting holes of the cover and connected to the copper foils respectively.

Also with this solution soldering on the diaphragm is unnecessary; nevertheless, it is still not free of drawbacks since it uses spring terminals. Moreover, the contact between the ceramics and the corresponding terminals is established at the inner zone of the diaphragm which is not allowed to vibrate freely.

SUMMARY OF THE INVENTION

It is therefore an object of the present invention to provide a piezoelectric transducer which is not subject to the same deficencies as the aforementioned prior art transducers.

Another object of the present invention is to provide a piezoelectric transducer of simplified and economical construction.

These and other objects, which will become more apparent hereinafter, are achieved by a piezoelectric transducer having the characteristics set forth in the characterizing portion of claim 1.

The invention will now be described with the aid of two embodiments shown in the accompanying drawings, illustrating merely an examplary and not limiting example, in which.

Figure 1:
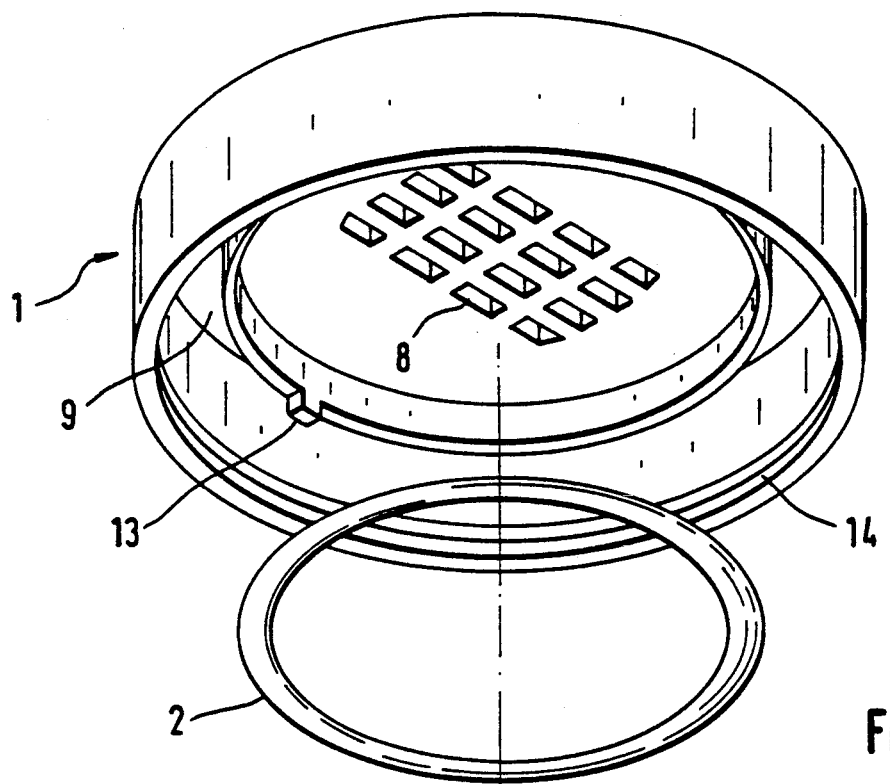
FIG. 1 is a perspective exploded view of a piezoceramic transducer designed to work as a piezoceramic capsule in a telephone instrument receiver according to the present invention.
Figure 1:
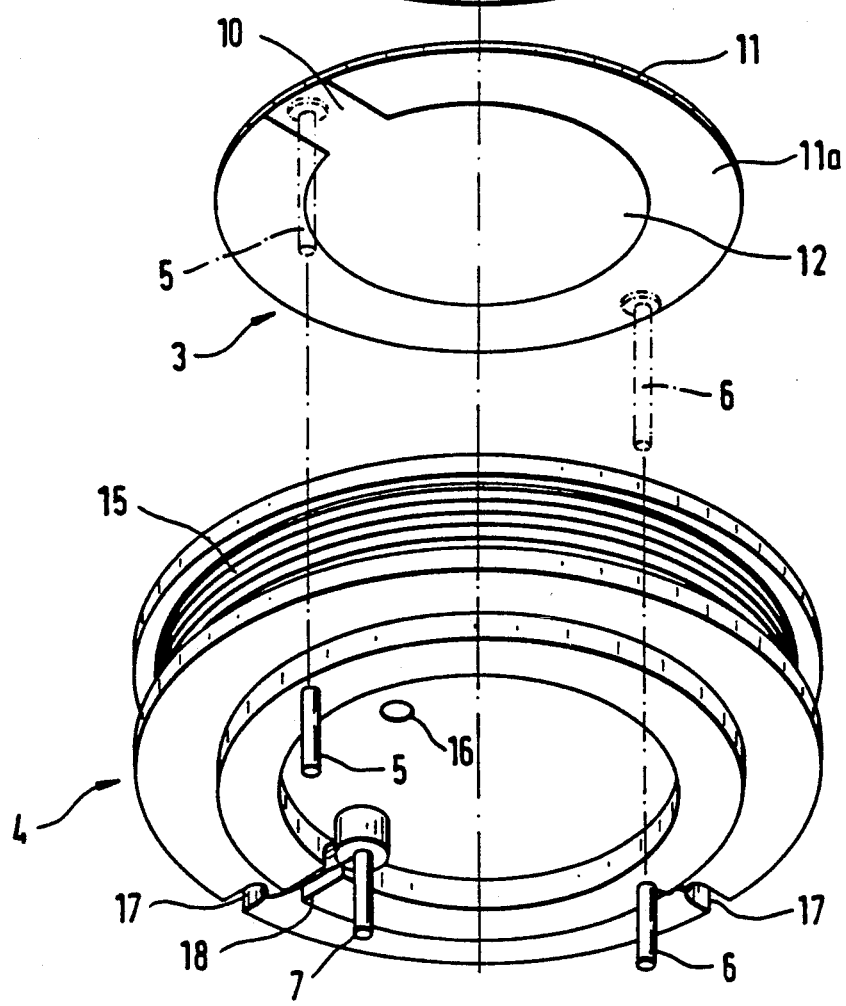
Figure 2:
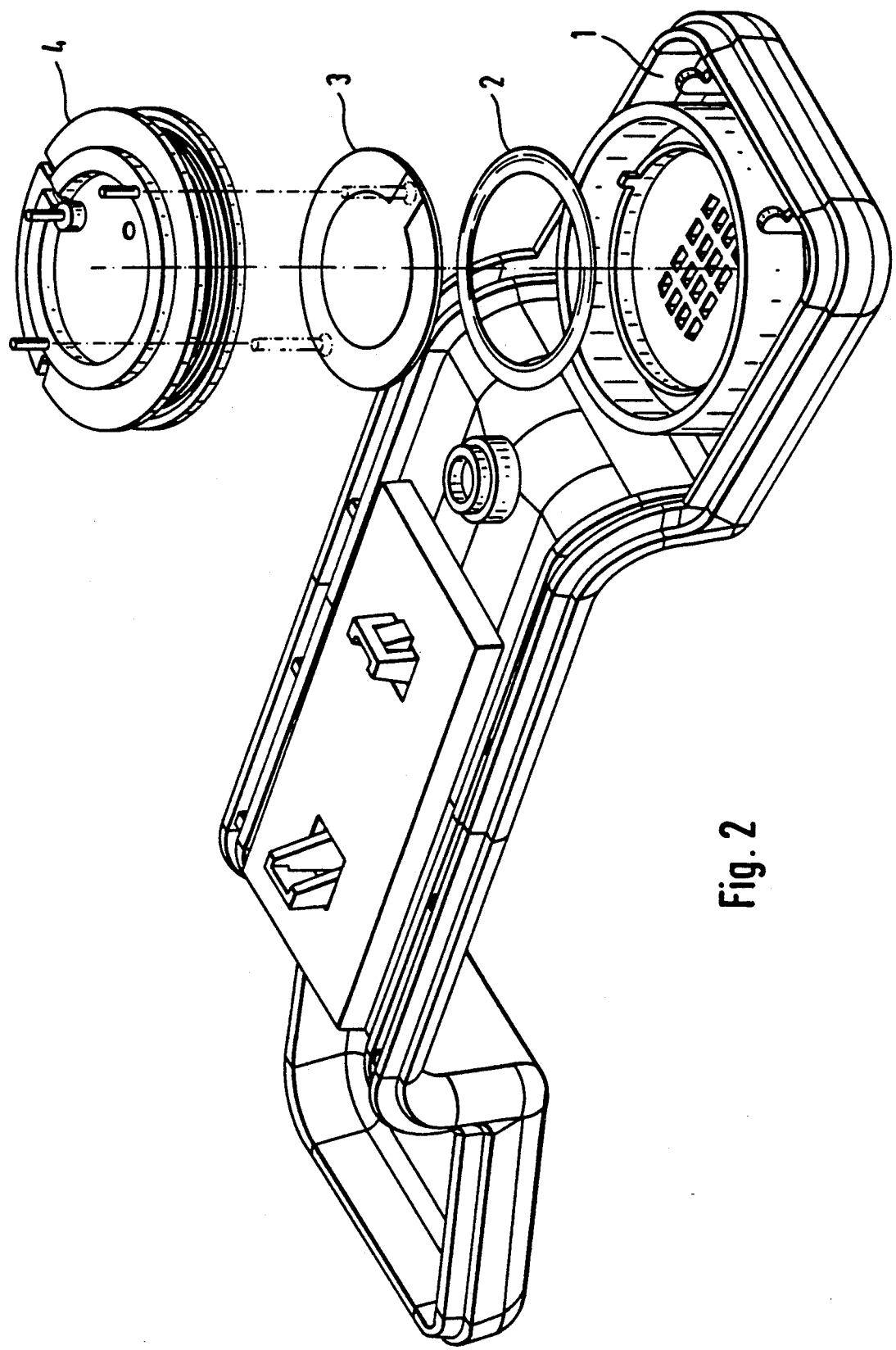
FIG. 2 shows the transducer of FIG. 1 where the case is formed directly on the bottom of the handset housing.
Figure 3:
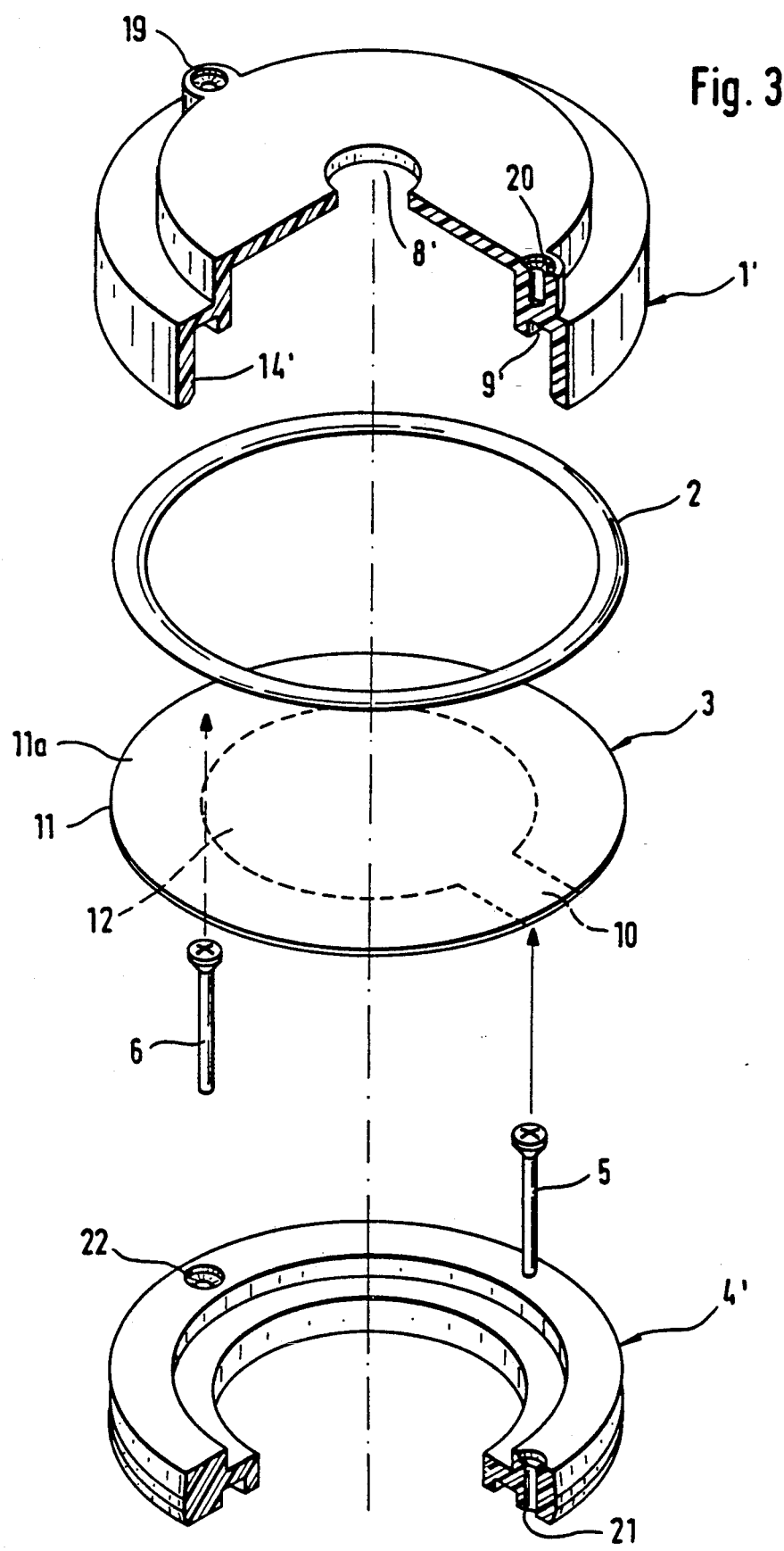
FIG. 3 shows a piezoceramic transducer designed to work as a tone caller in a telephone subset.

Referring now to FIGS. 1-3 in detail, like numerals indicate like elements throughout the several views. FIG. 1 shows a first embodiment of the piezoceramic transducer, according to the present invention, in the configuration to be used as a piezoceramic capsule in a telephone receiver. In this embodiment a case 1 houses an elastic element 2, a piezoceramic transducer diaphragm 3, and a bottom base 4 which carries contacts 5, 6, and 7 accessible from outside.

The case 1, made of insulating material, is produced by molding. In an embodiment which is particularly advantageous it can be molded directly on the bottom of the handset housing, thus further lowering costs of the transducer.

Preferably the case 1 has a circular section and the cover wall is provided with openings 8 for the transmission of acoustic waves generated by the vibrations of diaphragm 3. Inside on the cover wall, is a circular rib delimiting an annular groove 9 for the elastic element 2 and which is provided optionally with a reference tooth 13 which engages in a corresponding notch (not visible in the figure) provided on the inner end of the base 4.

At the upper end of the inner wall of the case 1 is an annular stop extension 14 designed to snap on the upper edge of the bottom base 4.

The piezoceramic diaphragm 3 is a composite type and consists of a metallic discoid plate 11 having a central portion of one of its sides covered, in a known and conventional manner, with a piezoceramic element 12 plated on its free surface with a layer of conductive material. The piezoceramic element 12 is provided with a terminal area 10 which extends through the circular annulus and forms a pole of the vibrator, while the other pole is formed by a remaining annulus portion 11a not covered by the ceramic layer.

The elastic element 2 consists preferably of an O-ring of elastomeric material which assures a uniform elastic coupling contact between terminals 5, 6 and the diaphragm poles 10, 11a respectively.

The capsule bottom base 4 consists of a circular spool of insulating material provided with two through holes extending axially and located at diametrically opposite positions and at a distance which is comprised between the diameter of the ceramic element 12 and the diameter of the metallic plate 11.

Two feedthrough terminals 5, 6 are forced into said through holes and constitute the contacts accessible from outside.

Advantageously such terminals have a nail-shaped configuration and are made of plate (e.g. silverplated) metal. The nail heads abut from one side on the end face of the spool and from the other on the diaphragm 3 when the transducer is assembled. A through-hole 16 axially extending is designed to achieve damping of microleaks of diaphragm 3.

FIG. 2 illustrates a variation of the embodiment of FIG. 1, in which case 1 is formed directly on the bottom of a telephone handset housing.

FIG. 3 illustrates an embodiment in which the transducer is used as a ringer in a telephone. In this embodiment a case 1' houses the elastic element 2, the piezoceramic transducer diaphragm 3, and a bottom base 4' which carries the contacts 5, 6 accessible from outside.

The case 1' is made of plastic material and consists of two cylindrical, coaxial, and adjacent portions of different diameters. The lesser diameter portion is closed at one end by an end-wall having an opening 8' for transmission of acoustic waves generated by the vibrations of the diaphragm 3. Inside the free end of the greater diameter portion is an annular extension 14' designed to snap on the bottom base 4'.

Both the portions define, at an inner interface zone, an annular groove 9' for the elastic element 2, which besides assuring the uniform elastic coupling contact between terminals 5, 6 and diaphragm poles 10, 11, provides for sealing in order to avoid leakage of the transducer.

On an annular step outside the case are two bosses 19 provided with holes 20 for fixing the transducer to the frame of the telephone.

The assembly of the transducer of the preferred embodiments is carried out in a very simple manner. After the positioning of the elastic element 2 inside the respective annular grooves 9, 9', the diaphragm 3 is laid down thereon with the ceramic element 12 facing the opening side of the respective case 1, 1' (the correct orientation of pole 10 is determined automatically by a machine which performs the positioning of the diaphragm).

Thereafter the respective bottom base assembly 4,4' is positioned with the terminal heads pointing toward the diaphragm and pushed in, thus compressing the elastic element 2 until the annular extension 14, 14' snaps on the base 4, 4'.

In such a way the heads of terminals 5 and 6 make an ohmic contact respectively with the poles 10 and 11 of diaphragm 3, whilst the elastic coupling for maintaining such ohmic contact.

The operation of the piezoceramic transducer is well known to those skilled in the art and therefore will not be described here.

Thus the invention fully achieves the above mentioned objects.

The piezoceramic transducer according to the present invention, besides eliminating all the drawbacks of the prior art transducers, is very easy to manufacture and assemble with very reduced costs as compared with those of conventional piezoceramic transducers. This is due to the fact that spring-shaped terminals have been eliminated.

While the invention has been described with reference to specific embodiments thereof, it should be noted that it is susceptible to several modifications and variations all falling within the sphere of the inventive concept.

For instance, the bottom base 4 of the transducer when used as a piezoceramic receive capsule may be provided with a circumferential groove along the lateral surface for housing a coil 15 electrically connected to the terminal 6 contacting the metallic plate 11 and to a third terminal 7 provided on the end of the spool 4 and also accessible from outside, said coil 15 being designed to generate an auxiliary magnetic field which may be used to operate a deaf prosthesis or hearing aid.

Notches 17, 18 are suitably provided on the base 4 for the passage of the coil leads to terminals 6, 7.

We claim:

1. A piezoelectric transducer assembly comprising:
   a piezoceramic transducing diaphragm including a support plate, a piezoceramic element, and two contact areas forming two poles of said diaphragm, said contact areas being situated on the same side of the diaphragm, one of said contact areas formed on the support plate;
   an elastic element;
   a perforated case; and
   a bottom base, said diaphragm being maintained peripherally between the perforated case and the bottom base by the elastic element, said bottom base carrying a pair of contacts accessible from outside of the transducer assembly, the diaphragm being oriented so that the contact areas of the diaphragm face said contacts;
   wherein said contacts include feedthrough terminals each having a respective end abutting a respective contact area of said diaphragm when the transducer assembly is assembled, electric connections between the contact areas of the diaphragm and the contacts being established by pressure produced by action of said elastic element; and
   wherein said feedthrough terminals comprise nail-shaped metallic pins forced into respective through-holes axially extending in said bottom base, so that a first surface of a nail-head of each of said pins abutting an inner surface of the bottom base and a second surface of the nail-head abutting a respective contact area of said diaphragm at a peripheral position with respect to the diaphragm when the transducer assembly is assembled.

2. A transducer assembly according to claim 1, wherein said perforated case at an open end thereof is provided with an annular extension designed to snap on an upper end of the bottom base when said bottom base is placed into said case and pushed in.

3. A transducer assembly according to claim 1, wherein said elastic element is an O-ring made of elastomeric material and is disposed inside an annular housing formed inside the case.

4. A transducer assembly according to claim 1, wherein one of said feed-through terminals is electrically connected with the contact area formed on said support plate, said bottom base comprises a circular spool, said spool being provided with a further contact accessible from outside of the transducer assembly and with a circumferential groove designed to house a metallic wire winding, said winding having leads connected to said further contact and to said feed-through terminal which is in electrically connection with the contact area formed on said support plate.

5. A transducer assembly according to claim 4, wherein said spool and said case are each provided with a reference element, the elements being designed to engage for correct positioning of the spool during assembling.

6. A transducer assembly according to claim 1, wherein said case is formed directly on a bottom of a telephone handset housing.

7. A piezoelectric transducer assembly as defined in claim 1, wherein said case is substantially circular and includes an annular extension engaging an end of said base.

8. A piezoelectric transducer assembly as defined in claim 1, wherein said case includes an annular groove, and said elastic element comprises an elastomeric O-ring disposed in said groove.

9. A piezoelectric transducer assembly as defined in claim 1, wherein said support plate is metal, one of said two contact areas is electrically connected to said support plate, and said base comprises:
- a substantially circular spool;
- a third contact element accessible from outside of said assembly; and
- a metallic wire winding having two leads and being disposed on said spool, one of said leads being electrically connected to said third contact element, the other one of said two leads being electrically connected to said one of said two contact areas which is in electrically connection with said support plate.

10. A piezoelectric transducer assembly as defined in claim 9, wherein said spool and said case include engaging alignment elements which correctly position said spool when said assembly is being assembled.

11. A piezoelectric transducer assembly as defined in claim 1, wherein said case is formed as an integral portion of a telephone handset housing.

* * * * *